Patented June 8, 1948

2,442,747

UNITED STATES PATENT OFFICE 2,442,747

ALLYL AND/OR METHALLYL ALCOHOL-MODIFIED CARBAMIDE - ALDEHYDE RESINS AND METHOD OF PRODUCING SAME

Robert W. Auten, Jenkintown, Pa., and William L. Evers, Moorestown, N. J., assignors to The Resinous Products & Chemical Company, a corporation of Delaware No Drawing. Application May 2, 1944, Serial No. 533,792

4 Claims. (Cl. 260—68)

This invention relates to the preparation of thermosetting resins of the carbamide-aldehyde type which are suitable for use in surface-coating compositions. It relates particularly to carbamide-aldehyde resins modified by etherification with allyl and methallyl alcohols.

It is well known to make heat-reactive resins which are soluble in organic solvents by the condensation of carbamides such as urea, aldehydes such as formaldehyde, and saturated aliphatic alcohols. The solubility of these resins in hydrocarbon solvents and their compatibility with alkyd resins, oils, and varnishes depend largely on the number of carbon atoms in the alcohol residue attached to the carbamide-aldehyde unit by etherification. The rate of cure or hardening of the resins and the ultimate hardness of the cured resin also depend upon the attached group; and, in general, the rate of cure and the hardness of the films of cured resin decrease as the number of carbon atoms in the alcohol molecule increases.

In accordance with this invention, new and unusual resins are prepared by the use of unsaturated allyl and methallyl alcohols in the modification of carbamide-aldehyde resins. The products, in which the allyl or methallyl group is attached, presumably by an ether link, to the resin molecules, are unique in that they may polymerize in two different ways—by condensation and by addition. In polymerization by condensation, a molecule of material, usually water, is split out, while in polymerization by addition, the molecules add together, usually at a double bond, without splitting out any portion thereof. Polymerization by addition is frequently referred to as "vinyl polymerization." The resulting products are capable of polymerizing in both ways. Thus, they may polymerize, under the influence of heat and/or acidic agents, in the manner characteristic of carbamide-aldehyde resins; and they may polymerize, under the influence of oxidizing materials such as peroxides, at the double bond of the alcohol residue in the manner characteristic of vinyl compounds.

As a result of their structure, the products of this invention have very unusual physical properties, especially in the completely polymerized form. While they have the typical hardness of carbamide-aldehyde resins, they also possess unusual toughness. Thus, they show a very advantageous combination of hardness and toughness which is lacking in carbamide-aldehyde-alcohol resins made with saturated acyclic alcohols.

The products of this invention are prepared by heating a carbamide, preferably urea, together with an aldehyde, preferably formaldehyde, and with allyl alcohol and/or methallyl alcohol. The three types of reagents may be mixed together and thereafter resinified. A preferred method, however, consists of first reacting the carbamide and the aldehyde to form the methylol derivative and thereafter reacting said derivative with the unsaturated alcohol. Ordinarily, an excess of the alcohol is employed and the reaction is carried out at refluxing temperature. Any water resulting from condensation of the resin and/or introduced with the reagents is removed. The resin is obtained as a solution in excess alcohol. If desired, some or all of the excess unsaturated alcohol may be removed by means of a solvent interchange. Solvents which do not take part in the resinification may be used, if desired. Suitable solvents include ethyl lactate and ethylene glycol monoethyl ether acetate.

Carbamides which may be used include urea, thiourea, and guanidine. While urea is the preferred carbamide, it is to be understood that it may be replaced at least in part by other carbamides, for example by thiourea.

Formaldehyde is the preferred aldehyde and may be used in solution, as in Formalin, or it may be used in a polymeric form, such as paraformaldehyde. It may also be used, at least in part, in a form, such as hexamethylene tetramine or a formal, which yields formaldehyde under the conditions of the reaction. A convenient form of formaldehyde is as a solution of paraformaldehyde in the allyl or methallyl alcohol. Although formaldehyde is preferred, it is within the scope of this invention to use other aldehydes such as benzaldehyde, furfuraldehyde, acetaldehyde, and the like. A mixture of aldehydes may be used, such as a mixture of formaldehyde and acetaldehyde.

The ratio of aldehyde to carbamide may vary. A range of about 1.5 to about 3 mols of aldehyde per mol of carbamide may be used, although the preferred range is 2.0 to about 2.6 mols of aldehyde per mol of carbamide.

The alcohols which are used to react with the carbamides and aldehydes are allyl and methallyl alcohols, which may be used individually or as mixtures. Because the alcohol may serve as a solvent for the reaction mixture, an excess over that amount which takes part in the reaction is ordinarily used. The minimum ratio of alcohol is 1.5 mols per mol of carbamide. The preferred ratio of alcohol per mol of carbamide is two to three for allyl alcohol and 1.8 to 3 mols for methallyl alcohol. Other alcohols, such as butanol, may be used together with the unsaturated alcohols, but their presence results in resins which do not have the full advantages of the straight allyl and methallyl alcohol products. The methallyl alcohol resins are more compatible than corresponding allyl alcohol products with other surface-coating materials such as vegetable oils, oleo-resinous varnishes, alkyd resins, and the like, but the allyl alcohol products are preferred on the basis of hardness and toughness.

The following example illustrates a method of preparing resins within the scope of this invention.

Into a three-necked flask equipped with a mechanical agitator, thermometer, and a fractionating column, was charged 300.25 grams of urea, 25.6 grams of allyl alcohol, and 1000 grams of a 30% solution of paraformaldehyde in allyl alcohol. (The mol ratios of formaldehyde, HCHO, and allyl alcohol per mol of urea were, respectively, 2.0 and 2.5.) A water separator attached to the fractionating column was filled with ethylene dichloride, and approximately fifty grams of ethylene dichloride was added to the reaction mixture. The ethylene dichloride serves to remove water as an azeotropic mixture. The reaction was heated to refluxing temperature and maintained at that point until no further apparent reaction takes place. The vapors condensed in the column were received in the water separator, where an aqueous layer and a lower layer of organic solvent formed. The aqueous layer was withdrawn from the separator and the organic layer was returned to the top of the column, thereby assuring a maximum reflux ratio and efficient fractionation. After a half hour of refluxing, three grams of formic acid was added as a catalyst for the co-reaction of the alcohol. Refluxing was continued for two and one-half hours, during which time an amount of water equal to about 60% of the weight of urea was removed. The separator was removed, and any ethylene dichloride present in the resinous product was removed by distillation.

The resultant product was a viscous solution which, at 70% resinous solids content, had a viscosity of about thirteen poises at room temperature and which tolerated dilution with toluene to the extent of about 2.5 cc. of toluene per gram of resinous solution before precipitation of the resin occurred.

The product resulting from the procedure above outlined was unusual in that it was capable of polymerizing by condensation and by addition. When the resinous solution was catalyzed with 1% of an acid (based on solid resin) such as oxalic acid, and thereafter flowed out as a film on glass and baked for fifteen minutes at 125° C., it was found to yield a very hard film, which, however, was brittle and definitely lacking in toughness. When this operation was repeated with the additional use of 5% (based on solid resin) of benzoyl peroxide, the film was again extremely hard but had acquired a toughness and adhesion which were entirely absent from the original film catalyzed with acid alone.

When catalyzed by heat and/or by acidic agents, the resinous products of this invention polymerize rapidly to infusible and relatively insoluble materials. Suitable acidic agents include inorganic acids typified by phosphoric acid, organic acids such as oxalic acid, other materials which yield acids under the conditions of polymerization, such as inorganic acid salts, acid anhydrides, and alkyl partial esters of inorganic acids such as alkyl phosphates.

Ultraviolet light and/or oxidizing catalysts promote the addition type of polymerization which these products may undergo. Organic peroxides, such as benzoyl peroxide; inorganic peroxides, such as sodium peroxide; and inorganic per-salts, such as ammonium persulfate, serve as catalysts. The addition type of polymerization may take place simultaneously with condensation polymerization or at another time. The addition type polymerization is ordinarily accompanied by an increase in the viscosity of the solutions of the resinous material. Whereas about 5% catalyst, based on the solid resin, appears to cause complete conversion of the addition type, smaller amounts may be used. Alternatively, portions of the catalyst may be added at intervals and a catalytic action, as measured by increased viscosity, effected with each addition. In this way, the viscosity may be increased in a stepwise manner. The process of adding the oxidizing catalyst in small portions provides a convenient means of obtaining a product of very high viscosity and of controlled viscosity without condensing the resin by means of heat to a point approaching the insoluble and infusible condition.

A preferred and convenient process of preparing resinous products which have outstanding properties comprises condensing by heating a carbamide, preferably urea, an aldehyde, preferably formaldehyde, and allyl and/or methallyl alcohol until resinification has occurred but gelation has not taken place. At this stage, varying amounts of an oxidizing catalyst, preferably benzoyl peroxide, is added. As a result, addition polymerization takes place, as is manifested by an increase in viscosity. The degree of polymerization, and hence the increase in viscosity, can be controlled by the amount of catalyst added. Five per cent benzoyl peroxide, for example, based on the resinous solids content, is the maximum effective amount, and smaller amounts are recommended. The catalyst may be added in small portions with suitable time intervals between additions. In this way, the viscosity can be made to increase stepwise and the addition of catalyst can be stopped when the desired viscosity is reached. In this way, too, resins which have very high viscosity but which are not highly condensed, and hence not low in solubility, may be prepared.

The product may be admixed with plasticizers, particularly with alkyd resins, to produce surface-coating materials of unusual properties. Because the portion of the resin molecule resulting from the combination of the unsaturated alcohol imparts a toughness to the product when polymerized, the product does not require such large amounts of plasticizer as carbamide-aldehyde resins condensed with saturated alcohols. This is a distinct advantage in many applications.

The products of this invention have other advantages over the well known resins made from carbamides, aldehydes, and saturated alcohols. Thus, the allyl and methallyl alcohol resins, containing three and four carbon atoms in the alcohol residue, are much harder, tougher, and more adhesive than corresponding resins made with the saturated alcohols of the same number of carbon atoms. Furthermore, they are more adhesive and cure faster. In fact, they have a combination of hardness, toughness, and speed of cure which is not found in any carbamide-aldehyde resin prepared with any saturated alcohol. They likewise excel in hardness, toughness, and speed of cure over such resins as the polymerizable allyl esters.

Because of their unusual combination of physical and chemical properties, they are ideally suited for use in surface-coatings such as clear and pigmented coatings for metal, force-dry wood finishes, high-speed thermosetting inks, and the like. They may also be used to advantage as hardeners for alkyd resins and oleo-resinous vehicles.

We claim:

1. The process of preparing hard, tough, resinous products which comprises reacting by condensing under the influence of heat and in the presence of an acidic catalyst until resinification but not gelation takes place one mole of a carbamide from the group consisting of urea, thiourea, and guanidine, 1.5 to 3.0 moles of an aldehyde from the group consisting of formaldehyde, acetaldehyde, benzaldehyde, and furfuraldehyde, and 1.5 to 3.0 moles of an unsaturated acylic alcohol from the group consisting of allyl alcohol and methallyl alcohol, and thereafter, while an acidic catalyst is present, polymerizing the resulting reaction product by heating it in the presence of a peroxidic catalyst.

2. The process of preparing a hard, tough, resinous product which comprises reacting by condensing under the influence of heat and in the presence of an acidic catalyst until resinification but not gelation takes place one mole of urea, 1.5 to 3.0 moles of formaldehyde, and 1.5 to 3.0 moles of allyl alcohol, and thereafter, while an acidic catalyst is present, polymerizing the resulting reaction product by heating it in the presence of a peroxidic catalyst.

3. The resinous product prepared by the process of claim 1.

4. The resinous product prepared by the process of claim 2.

ROBERT W. AUTEN.
WILLIAM L. EVERS.

REFERENCES CITED

The following references are of record in the file of this patent:

UNITED STATES PATENTS

| Number | Name | Date |
|---|---|---|
| 2,191,957 | Edgar et al. | Feb. 27, 1940 |
| 2,197,357 | Widmer et al. | Apr. 16, 1940 |
| 2,318,959 | Muskat et al. | May 11, 1943 |
| 2,335,701 | Root | Nov. 30, 1943 |